(12) United States Patent
Gourand

(10) Patent No.: US 6,786,353 B2
(45) Date of Patent: Sep. 7, 2004

(54) COVER LOCKING DEVICE

(75) Inventor: Thierry Gourand, Orchamps (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/887,078

(22) Filed: Jun. 25, 2001

(65) Prior Publication Data

US 2002/0038804 A1 Apr. 4, 2002

(30) Foreign Application Priority Data

Jun. 26, 2000 (FR) .............................. 00 08178

(51) Int. Cl.[7] .............................................. B65D 83/14
(52) U.S. Cl. ....................... 220/835; 220/833; 220/826; 220/827
(58) Field of Search ................................. 220/829, 830, 220/264, 263, 326, 833, 835, 826, 827

(56) References Cited

U.S. PATENT DOCUMENTS

| | | | | |
|---|---|---|---|---|
| 1,755,063 A | * | 4/1930 | Holden ........................ 220/326 |
| 3,904,073 A | * | 9/1975 | Schaefer et al. ............ 220/318 |
| 4,146,146 A | * | 3/1979 | Mar ........................ 220/315 X |
| 4,339,098 A | * | 7/1982 | Tardot et al. ........... 220/376 X |
| 4,399,826 A | * | 8/1983 | Ogasawara ................. 132/301 |
| 4,513,877 A | | 4/1985 | Taguchi et al. |
| 4,794,768 A | * | 1/1989 | Moser et al. ................. 70/105 |
| 4,799,604 A | * | 1/1989 | Okojima et al. ............ 220/260 |
| 5,000,339 A | * | 3/1991 | Wheat et al. ............... 220/203 |
| 5,033,162 A | | 7/1991 | Jacob et al. |
| 5,238,138 A | * | 8/1993 | Bois .......................... 220/334 |
| 5,413,317 A | * | 5/1995 | Spoerre ...................... 267/134 |
| 6,105,809 A | * | 8/2000 | Yamanaka .................. 220/326 |
| 6,176,385 B1 | * | 1/2001 | Feese et al. ................. 220/326 |
| 6,588,624 B1 | * | 7/2003 | Connors et al. ............ 220/827 |

FOREIGN PATENT DOCUMENTS

| | | |
|---|---|---|
| DE | 295 21 376 | 3/1997 |
| DE | 297 03 089 | 5/1997 |
| DE | 296 10 394 | 6/1997 |

* cited by examiner

Primary Examiner—Tri M. Mai
(74) Attorney, Agent, or Firm—Young & Thompson

(57) ABSTRACT

A lid includes resilient restoring element for returning the lid to an open position, and a locking mechanism actuated by a button. The locking mechanism including a locking member able to be placed at two well defined and stable positions, namely a locked position, where the locking member cooperates with the retainer element provided on the container for locking the lid in a closed position on the container, and an unlocked position where the lid is freely driven into its open position by the restoring element.

7 Claims, 6 Drawing Sheets

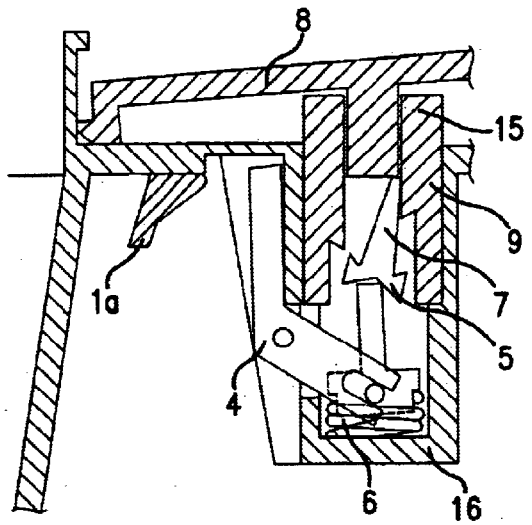
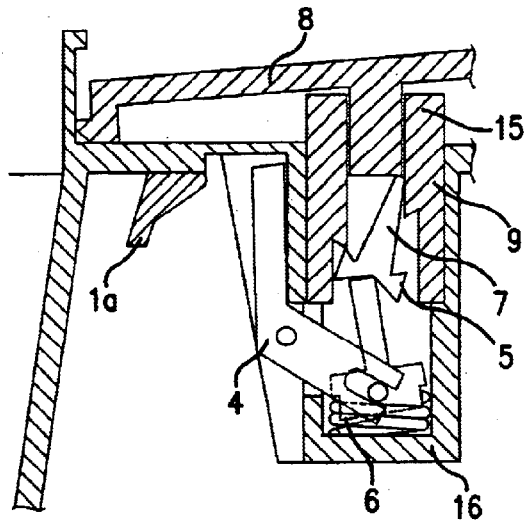
Fig. 4e     Fig. 4f
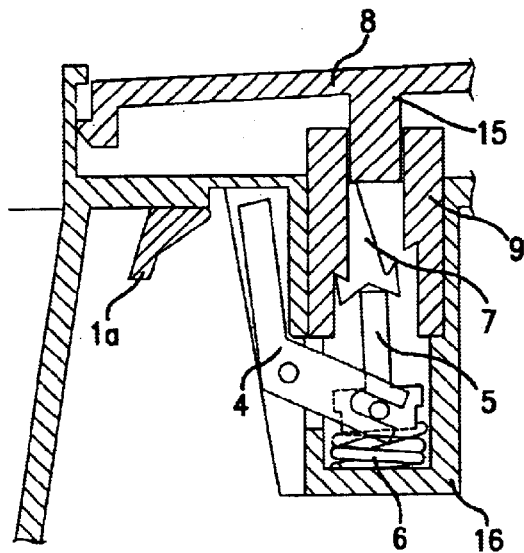
Fig. 4g

COVER LOCKING DEVICE

FIELD OF THE INTENTION

The present invention relates to the control of the opening and closure of a container closed by a lid.

In particular, although not exclusively, it can be applied to electric kettles to liquid heating appliances, having a container provided with a container grasping handle, a spout and an upper tilling opening that can be closed by a hinged lid.

Other applications can be contemplated in the field of small appliances, in particular a hinged lid on a coffee-pot filter-supporting tank, which filter-supporting tank is adapted for receiving ground coffee.

BACKGROUND ART

In this field, there are different types of container closure means using a lid whose opening and closure are performed by means of a push button.

A known exemplary apparatus comprises a push-button mounted on the handle cover, with a locking mechanism mounted adjacent the spout. In order to unlock and open the lid, the locking mechanism must become disengaged from the lid, so that the number of involved parts is large. Manufacturing such a mechanism is therefore complex and costly.

However, this mechanism can be simplified by mounting the lid locking mechanism at its hinge axis portion. Nevertheless, this solution leads to a lower safety level than the previous solution, inasmuch as an accidental tipping of the container can cause the lid to open in the spout area, since it is locked near the lid hinge axis.

There is also known a very simple solution wherein the lid opening and closure actuating push-button is provided on the handle, with the lid locking carried out at the lid hinge axis. This solution does not, however, allow a complete opening of the lid, so that, in particular, cleaning the container becomes difficult.

Another solution consists in mounting a spring-loaded push-button within the lid. This solution implies that the respective restoring forces of the push-button springs and the lid opening spring be calibrated so that the restoring force of the lid be greater than the one acting upon the push-button. Moreover, on closure, if the user leaves a finger on the button, the lid does not lock in its closed position,

SUMMARY OF THE INVENTION

It is an object of the present invention to eliminate these drawbacks. In order to do so, the present invention provides a lid for closing a container, which is hinged thereto, and comprises resilient means for restoring the lid in an open position and means for maintaining the lid in a closed position on the container.

According to this invention, the lid comprises a bistable locking mechanism and a button for actuating said locking mechanism, said bistable locking mechanism comprising a locking member able to be placed at well defined and stable locked and unlocked positions, said locking member cooperating in said locked position with retainer means provided on the container for maintaining said lid in its closed position, and being released from said looking member in said unlock position for letting said lid to be freely driven to its open position by said restoring means.

With these provisions, the opening and closure of the lid are carried out by a single pulse applied to the button. Also, the lid locking efficiency does not depend on the relative values of the restoring forces acting upon the lid and button, respectively. In addition, blocking of the lid in its closed position is ensured even if the user leaves a finger on the button, since the locking member remains blocked at its looked position.

Advantageously, the button extends over a major portion of the upper surface of the lid. Thus, it is more easily reached and actuated by the user.

According to one aspect of the present invention, the lid comprises a mechanism for damping and slowing down the opening of the lid for the lid to open slowly and smoothly.

BRIEF DESCRIPTION OF THE DRAWINGS

Various preferred embodiments of the inventive lid are described below, by way of non-limiting example, in reference to the accompanying drawings, in which:

FIGS. 4a–4g show detailed sectional views of the locking mechanism progressively moving from the locked position of FIG. 4 to the unlocked position of FIG. 5;

Figure 1:
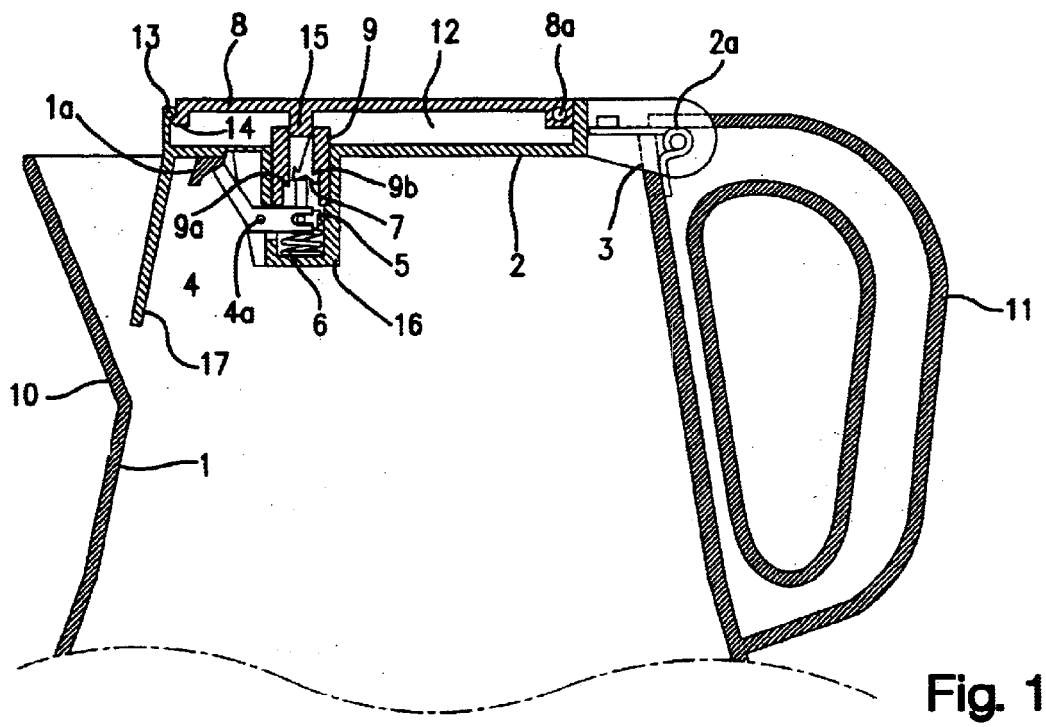
FIG. 1 is a partial sectional view of a container provided with a lid according to the present invention, in its closed position, with the locking mechanism being in its locked position.

The tilting member 7 has a substantially triangular cross-section and comprises a concave lower face cooperating with the upper end of the pusher 5 and two converging lateral faces, the angular connecting portions between the lower face and the lateral faces being continued, respectively, with two snugs 7a, 7b, which are made to cooperate with two teeth 9a, 9b, respectively, formed by shoulders on inner faces of sleeve 9, and located so as to face each other, tooth 9a being at a lower position within the sleeve, whereas tooth 9b is at a higher position relative to tooth 9a.

DETAILED DESCRIPTION

Figure 2:
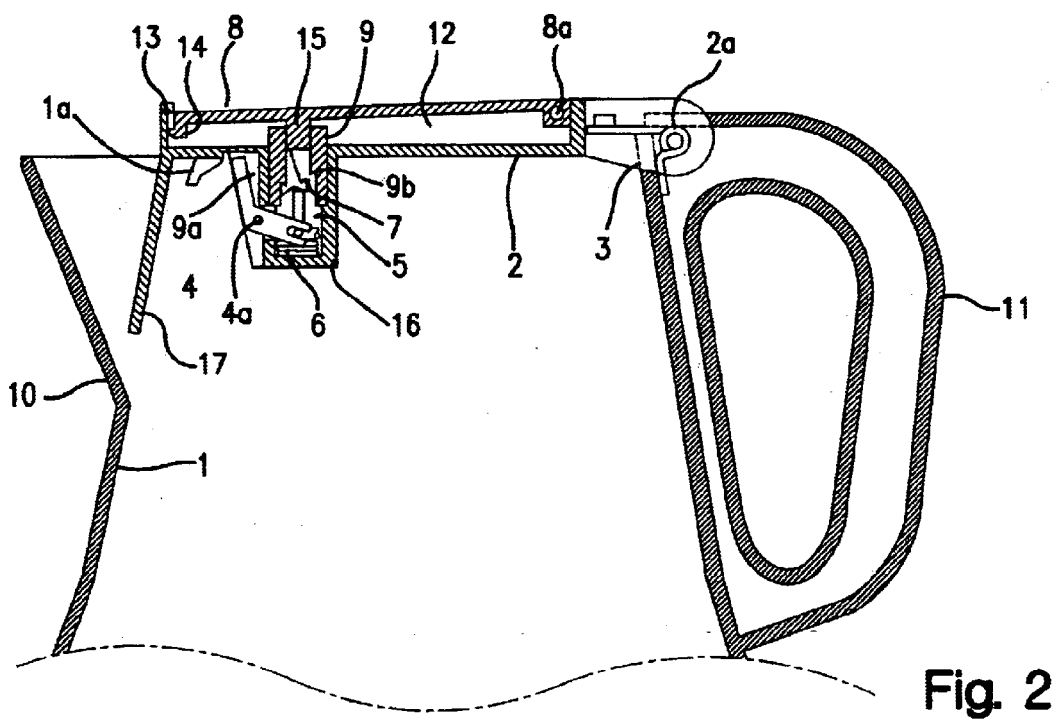
FIG. 2 is a partial sectional view of the container shown in FIG. 1, the locking mechanism being in its unlocked position.
Figure 3:
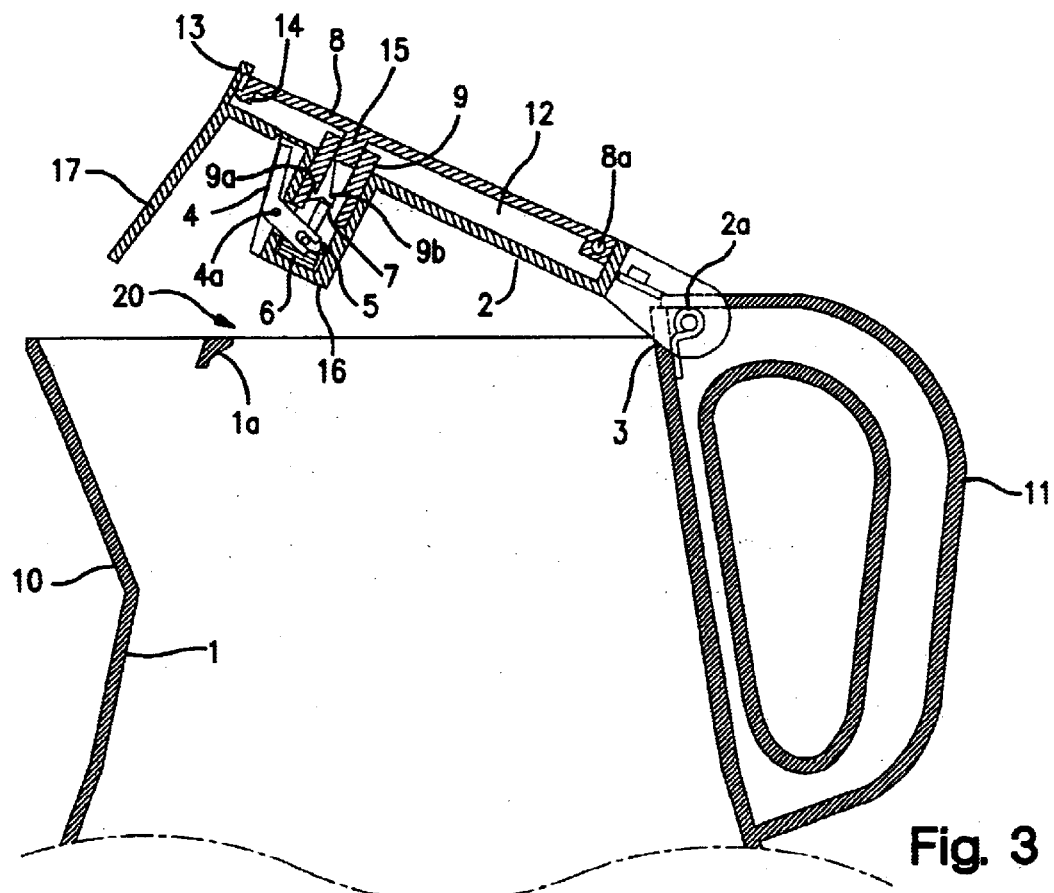
FIG. 3 is a partial sectional view of the container shown in FIG. 1, the lid being in its open position.

FIGS. 1 to 3 show a container 1 comprising an upper opening 20 closed by a lid 2, a spout 10 located adjacent this opening, and a handle 11 located opposite the spout relative to the opening. The lid is attached to the container 1 so that it can swing around an axis 2a located adjacent the handle 11, within the plane of the opening of the container 1 and perpendicular to a line joining the handle 11 to the spout. The lid is pushed in its open position by means of a restoring spring 3.

According to the present invention, the lid 2 comprises a push-button 8 extending at least partially over the lid's upper face, which button is mounted on the lid 2 to be pivoted around an axis 8a parallel to the axis 2a, with the lid forming the boundary of a cavity 12 closed by the button 8 and wherein the free end of the button can be pivoted to be engaged around the axis 8a into depressed position. The edge of the lid near the button free end comprises retainer means such as a snug 13, which cooperates with a shoulder-shaped catch portion 14 provided at the free end of the button 8 for retaining the same, and preventing it from coming off the cavity 12.

The button also comprises an actuation finger 15 of a lid locking mechanism formed on its side that faces the cavity 12.

Figure 4:
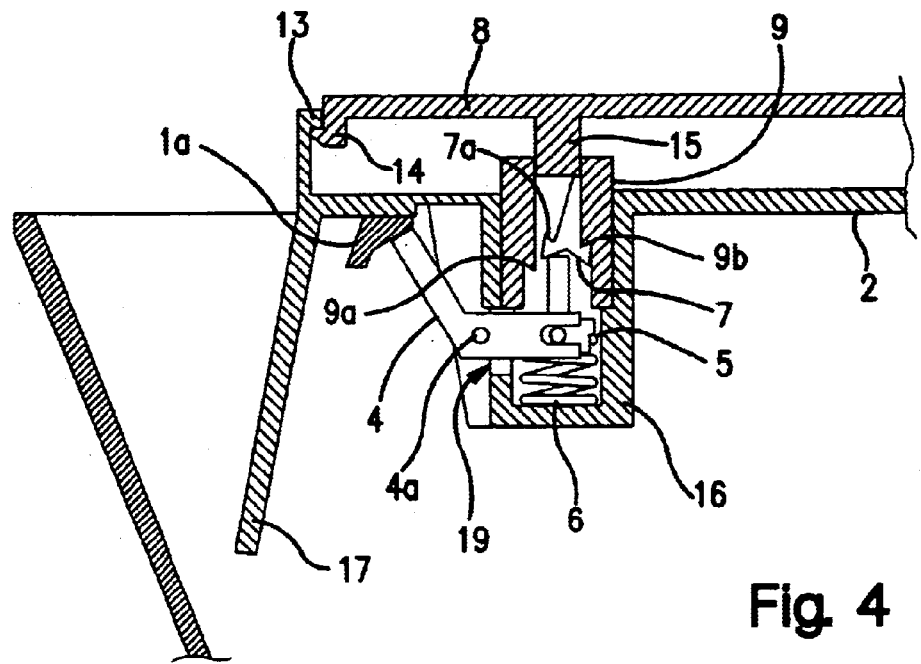
FIGS. 4 and 5 are detailed sectional views of the locking mechanism, shown in its locked and unlocked positions, respectively.
Figure 5:
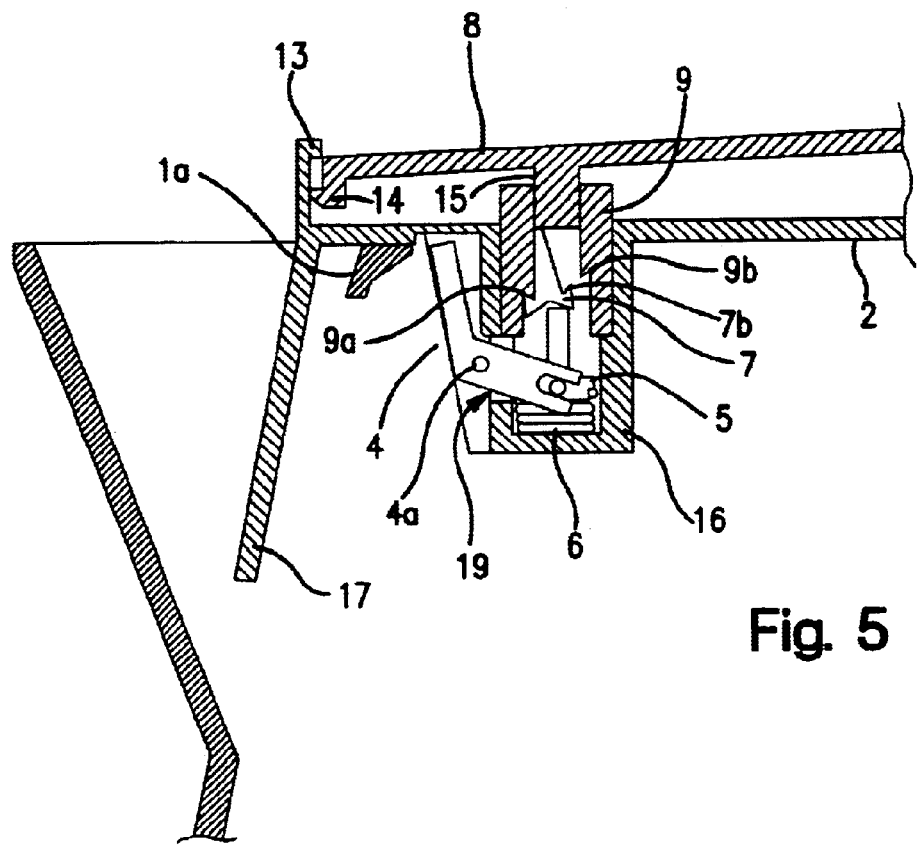
Figure 4A:
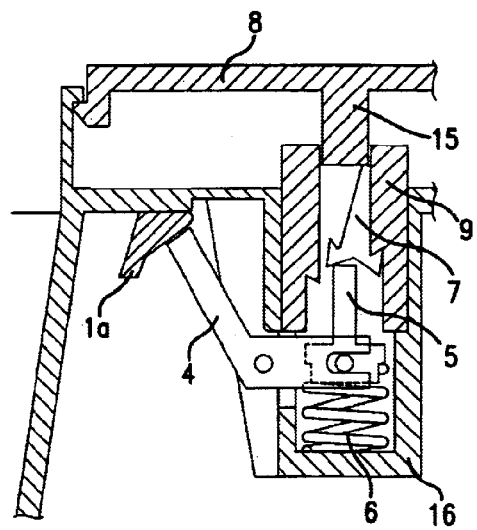
Figure 4B:
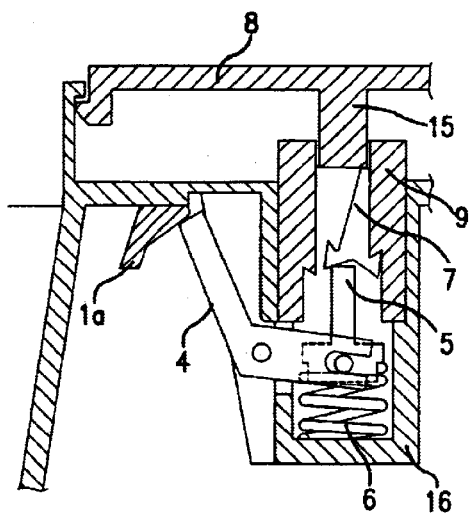
Figure 4C:
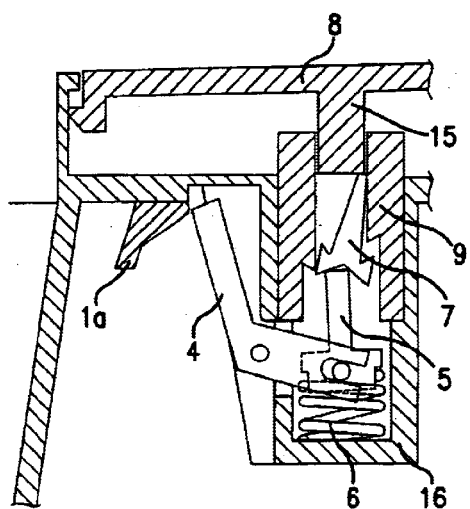
Figure 4D:
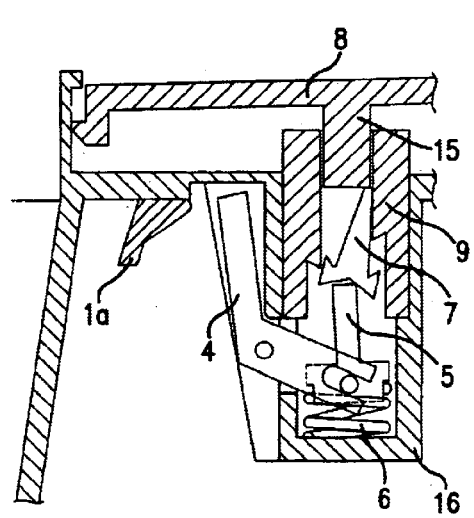

As may be seen in more detail in FIGS. 4 and 5, the locking mechanism is accommodated within a housing 16 integral with the lower face of the lid. This housing encloses:

- a sleeve 9 arranged perpendicular to the lid 2 and in which the finger 15 of the button 8 is inserted,
- a lever-shaped locking member 4, pivotally mounted on housing 16 around an axis 4a parallel to the axes 2a and 8a, so as to be pivoted between a locking position and an unlocked position,
- resilient restoring means such as a spring 6, for instance a coil spring, arranged coaxially to the sleeve 9 for returning the locking means to its locking position, so as to allow the lid 2, 2', 22 to be closed and locked on the container 1 when the locking member 4, 24 is in its locking position,
- a pusher 5 hinged at the ends of locking member 4 and arranged coaxially to the spring 6, and
- a tilting member 7 translationally movable within the sleeve 9, between the finger 15 and the pusher 5.

The lever-shaped locking member 4 comprises, on each side of its pivotal axis 4a, a first arm extending outside the housing, whose end is to cooperate with a ridge 1a integral with the container for locking the lid 2 in a closed position onto the container, and a second arm entering housing 16 through an aperture 19 made therefor with its end attached to the pusher 5 by means of a hinge.

The tilting member 7 has a substantially triangular cross-section and comprises a concave lower face cooperating with the upper end of the pusher 5 and two converging lateral faces, the angular connecting portions between the lower face and the lateral faces being continued, respectively, with two snugs 7a, 7b, which are made to cooperate with two teeth 9a, 9b, respectively, formed by shoulders on inner faces of sleeve 9, and located so as to face each other, tooth 9a being at a lower position within the sleeve, whereas tooth 9b is at a higher position relative to tooth 9a.

The above described locking mechanism can be placed at two stable positions, namely:

- a locking position wherein the finger 15 does not engage the sleeve 9, and the tilting member 7 is blocked in a higher locking position by its snug 7b, being engaged under tooth 9b of the sleeve, with one of its lateral faces pressing against the lower face of the sleeve which is located on the side of tooth 9b, the pusher 5 being in a higher position, the spring 6 being released and the lever 4 being in its locking position (FIG. 4), and
- an unlocked position reached when the button 8 is depressed, the finger 15 depressing the tilting member 7 until its snug 7a engages tooth 9a from below, which tilts its tip to a position where its other lateral face is pressed against the inner face of the sleeve on the side of tooth 9a, the pusher 5 being in its lower position, the spring 6 being in its compressed state, and the lever 4 being in its unlocked position where its free end disengages from the ridge 1a (FIG. 5).

Movement between FIGS. 4 and 5 as noted above and as further disclosed below can be seen in FIGS. 4a–4g.

It should be noted that if the pressure acting upon the button 8 is released, when the locking mechanism is in its locked position, the tilting member 7 remains blocked by tooth 9a, so that the locking mechanism is maintained in this position. For the locking mechanism to return to its locking position, a slight pressure needs only be applied to the button 8 so as to tilt the tilting member 7 away from tooth 9a, so that snug 7a tends to disengage from tooth 9a, since the pusher 5 cooperates with the concave shape of the lower face of the member 7. Thereafter, releasing the button 8 causes the tilting member 7 to rise back up, as it is pushed by the pusher 5 due to the action of the spring 6, and to tilt when snug 7b rests beneath the upper tooth 9b of the sleeve 9. As a result, the lever 4 swings into its locking position, and the tilting member 7 blocks itself at a higher position under tooth 9b.

For opening the container, it is therefore sufficient to press the button 8 in order to depress it until snug 7a of the tilting member passes below tooth 9a, and then to release the button, so as to block up the locking mechanism in its unlocked position and to move the lever 4 away from the ridge 1a, while the lid 2 opens under the action of the spring 3.

Conversely, in order to close the container, it is sufficient to press the button 8 in order to swing the lid down to its closed position, and to continue this movement in order to depress the button into the cavity 12 and thus to unblock the locking mechanism. By then releasing the button 8, the locking mechanism returns to its locking position, causing the lever 4 to move below the ridge 1a.

In this manner, the container lid can be closed and locked by a single continuous pivotal movement of the lid which is performed by exerting pressure upon the button 8, the opening being ensured by a single pressure impulse upon the button 8 in its closed position.

It should be noted that if the button 8 is actuated for swinging the locking mechanism into its locking position, while the lid is in its open position, the lid can still be returned and locked into its closed position on the container, since the lever 4 can be pivoted when passing over ridge 1a while compressing the spring 6, without the tilting member 7 being blocked in its lower position.

The lid is made integral with a partition wall 17 partially separating the inner volume of the container from the volume defined by the spout 10.

Figure 6:
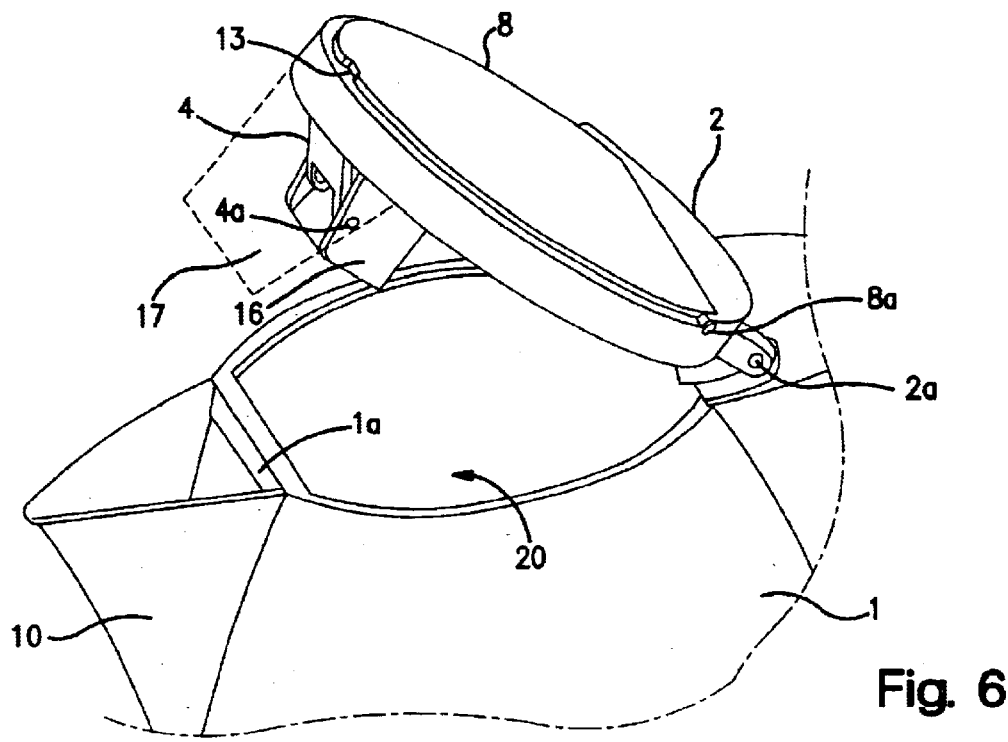
FIG.6 is a partial perspective view of the lid according to the present invention, shown in its open position.

As can be seen in FIG. 6, the button 8 is advantageously made of a plate which extends over a major portion of the lid 2. Of course, this button can have any other shape provided that the finger 15 can be actuated within the sleeve 9.

Figure 7:
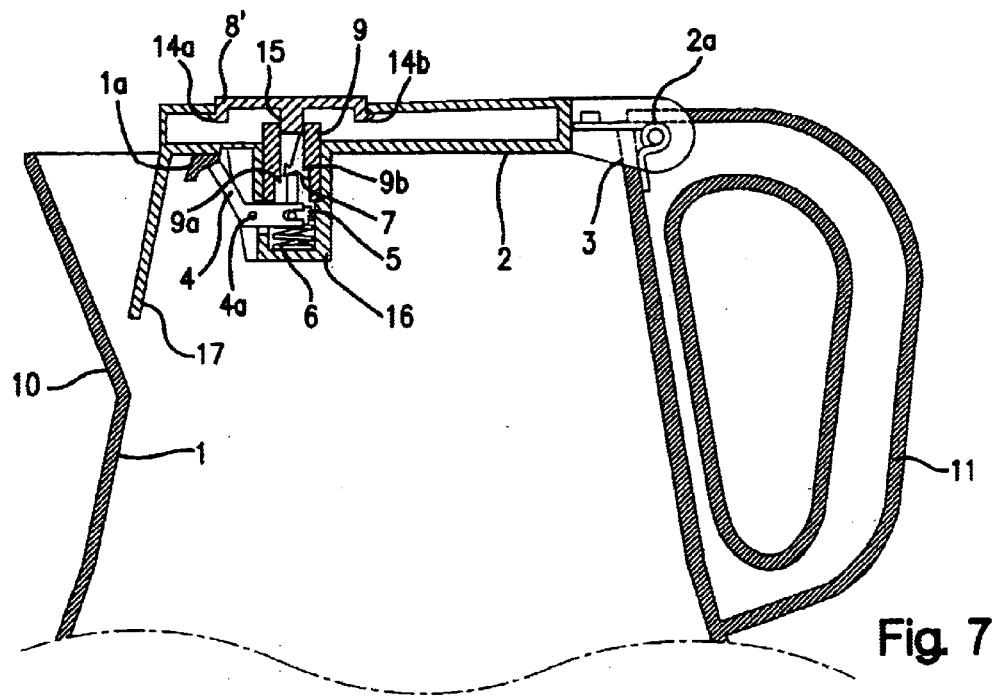
FIGS. 7 and 8 are partial sectional views of two variations of the lid according to the present invention.

Thus, as shown in FIG. 7, the button 8' is not pivotally mounted and extends over a small portion of the lower face of the lid 2' which comprises an upper wall and a lower wall firmly connected together. In this Figure, the button 8' has a ledge 14a along all of its periphery, or several ledges 14a, 14b retaining it within the lid 2'. This button actuates, by means of the finger 15, the same locking mechanism as the one shown in FIGS. 1 to 6.

Figure 8:
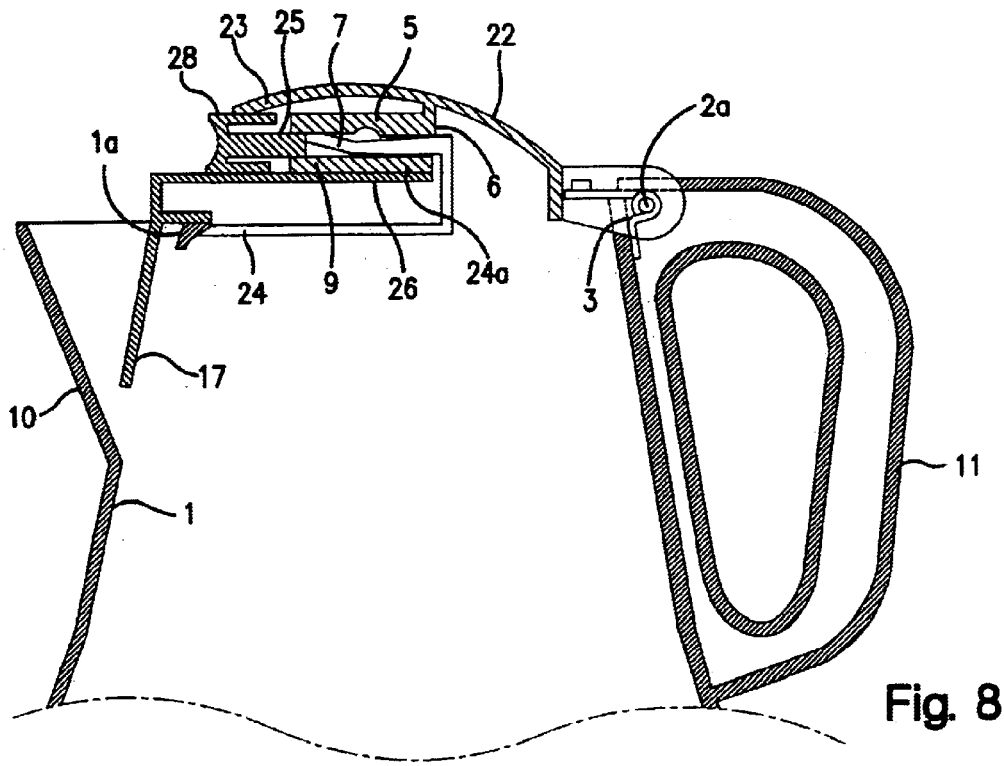

In FIG. 8, which shows another preferred embodiment of the present invention, the lid 22 comprises a button 28 adapted to be moved differently from the embodiment shown in the other Figures where it moves along an axis substantially perpendicular to the lid plane, but parallel or substantially parallel to the latter. Said button therefore comprises an actuating finger 25 also positioned along the movement axis of the button, and a button blocking snug 23 within the lid 22.

The lid 22, whose upper wall can be slightly bulged also comprises a bistable locking mechanism provided within a casing 26 integral with the lid, which arrangement comprises, as previously, a sleeve 9 enclosing a tilting member 7, a pusher 5 and a spring 6, which members are identical to those previously described, but are not arranged perpendicular to the lid plane, but parallel to this plane. The pusher 5 is attached, so as to be pivoted around an axis 24a, to a locking member 24 comprising a U-shaped arm, with the end of one of its legs being integral with the axis 24a and the end of the other leg being such as to block itself, as previously, but through a translational rather than pivotal movement, under the container ridge 1a. When the button is depressed, the locking member 24 moves away from below the ridge 1a, which causes the lid 22 to open.

As a modification, the above described bistable locking mechanism can be replaced with any other mechanism having the same function. Thus, this mechanism can be implemented as a ratchet wheel system such as those that are found in ball pens, or also as a heart-shaped cam system. A dual-cam system enclosing a central slug when the latter moves can also be used.

An arrangement for damping and slowing down the lid's opening, for ensuring a slow and smooth movement, can also be provided.

What is claimed is:

1. A lid for closing a container, said lid being pivotable from a closed position for closing the container to an open position, said lid being hinged to the container and comprising:

a first resilient member exerting a force on said lid for maintaining the lid in said open position;

a locking mechanism for maintaining the lid in said closed position; and a button for actuating said locking mechanism, said locking mechanism comprising a locking element that is movable from a stable locked position to a stable unlocked position, when said locking element is in said locked position, said locking member engaging a retaining element of the container so that the lid is locked in said closed position, and when said locking element is in said unlocked position, said lid is freely pivotable about the hinge from said closed position to said open position in response to said force, wherein the locking mechanism further comprises a tilting member having first and second engagement surfaces, said tilting member is actuated by said button-and slidable within a sleeve, said sleeve comprising a first blocking element for engaging said first engagement surface when the locking member is in the locked position, and a second blocking element for engaging said second engagement surface when the locking member is in the unlocked position.

2. A lid for closing a container, which is hinged thereto, said lid being movable from a closed position to an open position with respect to the container, said lid comprising:

a first resilient means for restoring the lid in said open position;

a locking mechanism for maintaining the lid in said closed position on said container; and a button for actuating said locking mechanism, said locking mechanism having first and second stable positions and comprising a locking member able to be placed at well defined and stable locked and unlocked positions corresponding to said first and second stable positions, said locking member cooperating in said locked position with a first retaining means provided on the container for maintaining said lid in said closed position, and said first retaining means being released from said locking member in said unlocked position for enabling said lid to be freely driven to said open position by said first resilient means, wherein the locking mechanism comprises a tilting member which is movably mounted in translation within a sleeve, and is actuated by said button, for acting upon said locking member, and wherein said sleeve comprises first means for blocking said tilting member in a first position when the locking member is in said locked position, and second blocking means for blocking said tilting member in a second position when the locking member is in said unlocked position.

3. The lid according to claim 2, further comprising a second resilient means for returning the tilting member from said second position to said first position, so that the lid can be closed and locked onto the container, when the locking member is in said locked position.

4. The lid according to claim 2, wherein the button is movable along an axis substantially perpendicular to a plane of the lid.

5. The lid according to claim 2, wherein the button is movable along an axis substantially parallel to a plane of the lid.

6. The lid according to claim 2, wherein the button is pivotally mounted on the lid around an axis parallel to a hinge axis of the lid on the container.

7. A lid for closing a container, which is hinged thereto, said lid being movable from a closed position to an open position with respect to the container, said lid comprising:

a first resilient means for restoring the lid in said open position;

a locking mechanism for maintaining the lid in said closed position on said container; and a button for actuating said locking mechanism, said locking mechanism having first and second stable positions and comprising a locking member able to be placed at well defined and stable locked and unlocked positions corresponding to said first and second stable positions, said locking member cooperating in said locked position with a first retaining means provided on the container for maintaining said lid in said closed position, and said first retaining means being released from said locking member in said unlocked position for enabling said lid to be freely driven to said open position by said first resilient means, wherein the button extends over a major portion of an upper surface of the lid.

* * * * *